United States Patent [19]
Campbell et al.

[11] 3,869,434
[45] Mar. 4, 1975

[54] SOLUBLE ARYLENE SULFIDE POLYMERS

[75] Inventors: Robert W. Campbell; Lacey E. Scoggins, both of Bartlesville, Okla.

[73] Assignee: Phillips Petroleum Company, Bartlesville, Okla.

[22] Filed: Nov. 19, 1973

[21] Appl. No.: 416,783

[52] U.S. Cl.................... 260/79.1, 117/72, 260/79
[51] Int. Cl............................................. C08g 23/00
[58] Field of Search............................. 260/79, 79.1

[56] References Cited
UNITED STATES PATENTS
3,538,166   11/1970   Campbell et al.................... 260/609

*Primary Examiner*—Melvyn I. Marquis

[57] ABSTRACT

A method of producing novel soluble, substantially amorphous phenylene sulfide polymers employing at least one m-dihalobenzene and at least one p-dihalobenzene. Polymer products are defined.

15 Claims, No Drawings

SOLUBLE ARYLENE SULFIDE POLYMERS

This invention pertains to soluble arylene sulfide polymers.

In one of its more specific aspects, this invention relates to both the production of arylene sulfide polymers and to the polymers, themselves.

The production of arylene sulfide polymers is the subject of such patents as U.S. Pat. No. 3,354,129 to Edmonds et al. Generally, in the process disclosed therein a mixture comprising a polyhalo-substituted aromatic compound, an alkali metal sulfide and a polar organic compound is subjected to polymerization conditions to produce a polymer.

There has now been discovered a novel process of producing novel arylene sulfide polymers which possess properties different from those properties possessed by polymers produced by the aforementioned process. The polymers produced by the method of the present invention can be readily cured through cross-linking and/or chain extension by thermal and chemical means to provide cured products having high thermal stability and good chemical resistance and which thus have general utility in applications where such properties are desired. Unexpectedly, uncured phenylene sulfide polymers of the present invention have been found to be readily soluble in organic solvents such as tetrahydrofuran and chloroform at room temperatures. The polymers of this invention are therefore particularly useful in applications in which it is desirable to have the polymer in solution at some time during its use, for example, in solution coating operations such as in solution coating metal or other substrates in the form of wire, sheets, pipes, rods and the like or in film production.

In contrast, a phenylene sulfide polymer prepared from either a m-dihalobenzene or a p-dihalobenzene, in the absence of the other isomer, is nearly insoluble in such solvents even at their normal boiling points and despite the fact that the polymer from only the m-dihalobenzene has no crystallinity presently detectable by differential thermal analysis.

Unlike a phenylene sulfide polymer prepared from a p-dihalobenzene, in the absence of the meta isomer, the phenylene sulfide polymers of the present invention have no, or substantially no, crystallinity as determined by differential thermal analysis.

In one embodiment of the present invention, soluble, substantially amorphous phenylene sulfide polymers are produced by reacting at least one m-dihalobenzene and at least one p-dihalobenzene with a mixture in which at least one alkali metal sulfide is contacted with at least one organic amide at polymerization conditions for a period sufficient to form the phenylene sulfide polymer, after which the polymer is recovered.

The halogen atoms in the m-dihalobenzene will be selected from the group consisting of chlorine, bromine and iodine. Suitable m-dihalobenzenes which can be employed include m-dichlorobenzene, m-dibromobenzene, m-diiodobenzene, 1-chloro-3-bromobenzene, 1-chloro-3-iodobenzene, 1-bromo-3-iodobenzene and mixtures thereof.

The halogen atoms in the p-dihalobenzene will be selected from the group consisting of chlorine, bromine and iodine. Suitable p-dihalobenzenes which can be employed include p-dichlorobenzene, p-dibromobenzene, p-diiodobenzene, 1-chloro-4-bromobenzene, 1-chloro-4-iodobenzene, 1-bromo-4-iodobenzene and mixtures thereof.

The alkali metal sulfides which can be employed include the monosulfides of lithium, sodium, potassium, rubidium and cesium, individually or as mixtures, in anhydrous or in hydrated forms. Sodium sulfide in hydrated form is preferred. If desired, the alkali metal sulfides can be produced in situ, e.g., from the alkali metal hydroxides and the alkali metal bisulfides.

When the alkali metal sulfide is employed as a hydrate, it is preferable that at least some water of hydration be removed prior to intermixing the dihalobenzenes with the mixture in which an alkali metal sulfide has been contacted with the organic amide. Distillation can be used for this removal.

Instead of alkali metal sulfides, other sources of sulfur can be employed in the production of the phenylene sulfide polymers of this invention. For example, the sulfur source can be an alkali metal bisulfide or, when used with a base such as an alkali metal hydroxide, the sulfur source can be, for example, a metal thiocarboxylate, a metal thiosulfate, a thioamide, elemental sulfur, carbon disulfide or carbon oxysulfide, a thiocarbamate, a xanthate, a trithiocarbonate, an activated mercaptan or sulfide, or the like, or mixtures thereof.

The organic amide employed should be substantially liquid at the polymerization temperatures and pressures employed. The organic amides will include cyclic and acyclic amides having 1 to about 10 carbon atoms per molecule.

Examples of suitable organic amides include formamide, acetamide, N-methylformamide, N,N-dimethylformamide, N,N-dimethylacetamide, N-ethylpropionamide, N,N-dipropylbutyramide, 2-pyrrolidone, N-methyl-2-pyrrolidone, ε-caprolactam, N-ethyl-ε-caprolactam, N,N'-ethylenedi-2-pyrrolidone, hexamethylphosphoramide, tetramethylurea, and the like, and mixtures thereof.

The dihalobenzenes will be employed in a total amount of at least about 0.9 mole per mole of alkali metal sulfide to an amount not greater than about 2 moles per mole of alkali metal sulfide. The meta isomer will comprise from about 35 to about 90 mole percent and preferably from about 40 to about 85 mole percent of the total quanity of dihalobenzenes employed.

The amount of organic amide can vary over a wide range. Preferably, the organic amide will be employed in an amount within the range of from about 100 grams to about 2,500 grams per gram-mole of alkali metal sulfide.

The conditions under which the mixture can be maintained to effect polymerization can vary over a considerable range. Generally, a temperature within the range of from about 125° C. to about 450° C. will be employed. Preferably, a temperature within the range of from about 175° C. to about 350° C. will be employed.

The mixture can be subjected to polymerization conditions for a period dependent, in part, on the temperature employed. Generally, a period within the range of from about 10 minutes to about 72 hours will be employed although a period within the range of from about 1 to about 8 hours usually is preferred. The pressure need only be sufficient to maintain the dihalobenzenes and the organic amide substantially in the liquid phase and to retain the sulfur source therein.

The phenylene sulfide polymers can be recovered from the polymerization mixture by conventional procedures such as evaporation of the solvent followed by washing with water, or by dilution of the polymerization mixture with water followed by filtration and water-washing of the polymer.

The polymers of this invention in their uncured state will have a solubility in tetrahydrofuran at 25° C. of at least 5 parts by weight per 100 parts by weight tetrahydrofuran.

The polymers of this invention can be blended with fillers, pigments, stabilizers, softeners and the like. The polymers can be cured by heating to a temperature within the range of from about 260° C. to about 480° C. and preferably between about 300° C. and about 430° C. for about 5 minutes to about 20 hours and preferably for about 10 minutes to about 6 hours. Preferably, this heating will be carried out in the presence of air or other free oxygen-containing gas. Curing promoters can be employed.

The previous statements are based upon the following examples.

In these examples, the glass transition temperature, ($T_g$), and crystalline melting point, ($T_m$), were determined by differential thermal analysis. Inherent viscosities were determined at 206° C. in 1-chloronaphthalene at a polymer concentration of 0.4 g/100 ml solution.

EXAMPLE I

This example is directed towards illustrating the effect of employing a molar ratio of the dihalobenzenes outside of those ranges within the scope of the invention as set forth above. The molar ratio of m-dichlorobenzene to p-dichlorobenzene was 25 to 75.

A mixture of 127.2 g (1.0 mole) of hydrated sodium sulfide (61.3 weight percent $Na_2S$) and 276.7 g of N-methyl-2-pyrrolidone was prepared and heated under a nitrogen flush to 203° C. in 2 hours, 10 minutes to remove water. The mixture was cooled at 175° C. and a solution of 112.4 g (0.765 mole) of p-dichlorobenzene and 37.5 g (0.255 mole) of m-dichlorobenzene in 50 g of N-methyl-2-pyrrolidone was added.

The reactor containing the mixture was closed under 35 psig nitrogen and heated to 245° C. After 3 hours at 245° C. and a pressure of 70–155 psig, the mixture was cooled to about 25° C. to recover the polymer product.

The polymer was removed from the reactor as a suspension. Water was added to the suspension and the polymer was filtered and washed with water at about 80° C. and was dried at 80° C. under a vacuum.

There were recovered 103.1 g of phenylene sulfide polymer having an inherent viscosity of 0.11, a $T_g$ of 68° C. and a $T_m$ of 205° C.

The polymer was substantially insoluble in tetrahydrofuran, the solubility being less than 0.1 g per 100 g of tetrahydrofuran at a reflux temperature of about 64° C.

EXAMPLE II

This example is directed towards illustrating the effect of employing a molar ratio of the dihalobenzenes within the range of the invention as set forth above. The molar ratio of the m-dichlorobenzene to the p-dichlorobenzene was 50 to 50.

A mixture comprising 255 g (2.0 moles) of hydrated sodium sulfide (61.3 weight percent $Na_2S$) and 460 g of N-methyl-2-pyrrolidone was prepared. The reactor containing the mixture was flushed with nitrogen by pressuring to 200 psig and venting. The reactor was then heated to a temperature of 200° C., during which time 54 g of water were removed by distillation. A mixture comprising 148 g (1.009 mole) of p-dichlorobenzene, 148 g (1.009 mole) of m-dichlorobenzene and 200 g of N-methyl-2-pyrrolidone was then introduced into the reactor after which the nitrogen pressure in the reactor was 100 psig.

The reactor was heated to 250° C. and maintained at that temperature for 3 hours during which period the pressure was increased from 110 psig to 190 psig. The reactor was cooled and the polymer was precipitated with water. The polymer was water-washed at 25° C., filtered and vacuum dried at 70° C.

There were recovered 172 g of phenylene sulfide polymer having an inherent viscosity of 0.09, a $T_g$ of 49° C. and no $T_m$ detectable.

The solubility of the polymer was greater than 20 g per 100 g of either chloroform or tetrahydrofuran at 25° C.

A mixture comprising 60 parts by weight polymer, 20 parts by weight titanium dioxide and 150 parts by weight propylene glycol was applied as three coats to a carbon steel substrate. The polymer was cured by heating at 700° F. for 30 minutes after the application of each coating. The final coating was tough, flexible and insoluble in common solvents.

EXAMPLE III

This example is directed towards illustrating the operability of another molar ratio of the dihalobenzenes within the range of the invention as set forth above. The molar ratio of the m-dichlorobenzene to the p-dichlorobenzene was 75 to 25.

A mixture of hydrated sodium sulfide and N-methyl-2-pyrrolidone as described in Example I was prepared. The mixture was heated to 200° C. in 2 hours and 33 ml of distillate containing 19 grams of water were removed by distillation.

A solution of 37.5 g (0.255 mole) of p-dichlorobenzene and 112.4 g (0.765 mole) of m-dichlorobenzene in 50 g of N-methyl-2-pyrrolidone was added as in Example I and polymerization was conducted as in Example I.

The polymerization mixture was poured into cold water and the polymer which precipitated was filtered and washed in water. The polymer was then dissolved in tetrahydrofuran, the resulting solution was filtered and the polymer was precipitated by addition of the filtrate to water.

The polymer was filtered, dissolved in tetrahydrofuran and the resulting solution was stirred with charcoal and filtered.

The polymer was precipitated by the addition of cold water. The polymer was washed in methanol and dried.

There were recovered 49.5 g of phenylene sulfide polymer having an inherent viscosity of 0.05, a $T_g$ of 27° C. and no $T_m$ detectable. The solubility of the polymer was 42 g per 100 g tetrahydrofuran at about 25° C.

EXAMPLE IV

This example is directed towards illustrating, comparatively, the properties of a polymer prepared by a method outside of the scope of the invention, that is, in a polymerization employing m-dichlorobenzene in the substantial absence of p-dichlorobenzene.

A mixture comprising hydrated sodium sulfide and N-methyl-2-pyrrolidone was prepared as in Example I. The mixture was heated to 203° C. in 2 ½ hours and 30 ml of distillate containing 21 g of water was collected.

A solution of 149.9 g (1.0 mole) of m-dichlorobenzene in 50 g of N-methyl-2-pyrrolidone was added to the residual composition above, and the resulting mixture was heated at 245° C. at a pressure of 75-170 psig for 3 hours.

After cooling to about 25° C., water was added and the polymer was filtered, washed thoroughly with water and dried in a vacuum.

There were recovered 104.7 g of phenylene sulfide polymer having an inherent viscosity of 0.01, a $T_g$ of 15° C. and no $T_m$ detectable.

The solubility of this polymer was only 0.5 g per 100 g of tetrahydrofuran near its boiling point of about 64° C.

It is to be understood that the method of this invention can be carried out by mixing the starting materials, that is, the dihalobenzenes, the alkali metal sulfide and the organic amide, in any order. It is also to be understood that a composite can be formed of any two or more of the aforementioned materials with the remaining material or materials being introduced into the composite.

It is also to be understood that the aforementioned materials can be employed in the form of aqueous mixtures or hydrates and that subsequent to any contacting step between materials, water can be removed from the resulting composition, e.g., by distillation. For instance, water can be removed by distillation from a mixture obtained by admixing hydrated alkali metal sulfide with the organic amide, after which the residual mixture can be admixed with the dihalobenzenes, and the resulting mixture then maintained at polymerization conditions.

It will be evident from the foregoing that various modifications can be made to the method of this invention. However, such are considered to be within the scope of the invention.

What is claimed is:

1. A method of producing polymers which comprises:
    a. contacting at least one m-dihalobenzene, at least one p-dihalobenzene, at least one alkali metal sulfide selected from the group consisting of sulfides of lithium, sodium, potassium, rubidium and cesium, and at least one organic amide to form a composition;
    b. maintaining at least a portion of said composition at polymerization conditions to produce said polymer, said m-dihalobenzene being employed in an amount within the range of from about 35 to about 90 mole percent of the total moles of said m-dihalobenzene and said p-dihalobenzene with said m-dihalobenzene and said p-dihalobenze being contacted in an amount within the range of from about 0.9 to about 2 moles total per mole of said alkali metal sulfide; and
    c. recovering said polymer.

2. The method of claim 1 in which the halogen atoms of said m-dihalobenzene and said p-dihalobenzene are each selected from the group consisting of chlorine, bromine and iodine.

3. The method of claim 1 in which said m-dihalobenzene is selected from the group consisting of m-dichlorobenzene, m-dibromobenzene, m-diiodobenzene, 1-chloro-3-bromobenzene, 1-chloro-3-iodobenzene, 1-bromo-3-iodobenzene and mixtures thereof.

4. The method of claim 1 in which said p-dihalobenzene is selected from the group consisting of p-dichlorobenzene, p-dibromobenzene, p-diiodobenzene, 1-chloro-4-bromobenzene, 1-chloro-4-iodobenzene, 1-bromo-4-iodobenzene and mixtures thereof.

5. The method of claim 1 in which said m-dihalobenzene is m-dichlorobenzene, said p-dihalobenzene is p-dichlorobenzene, said alkali metal sulfide is sodium sulfide and said organic amide is N-methyl-2-pyrrolidone.

6. The method of claim 5 in which said m-dichlorobenzene and said p-dichlorobenzene are employed in an equimolar ratio.

7. The method of claim 5 in which said m-dichlorobenzene and said p-dichlorobenzene are employed in a molar ratio of about 75 to about 25.

8. The method of claim 1 in which water is removed from the composition formed in step (a).

9. A method of producing a polymer which comprises:
    a. contacting an alkali metal surfide with an organic amide to form a first composition, said alkali metal sulfide being selected from the group consisting of sulfides of lithium, sodium, potassium, rubidium and cesium;
    b. contacting at least a portion of said first composition with at least one m-dihalobenzene and at least one p-dihalobenzene to form a second composition, said m-dihalobenzene being employed in an amount within the range of from about 35 to about 90 mole percent of the total moles of said m-dihalobenzene and said p-dihalobenzene with said m-dihalobenzene and said p-dihalobenzene being employed in an amount within the range of from about 0.9 to about 2 moles total per mole of said alkali metal sulfide; and
    c. maintaining at least a portion of said second composition at polymerization conditions to form said polymer.

10. The method of claim 9 in which the halogen atoms of said m-dihalobenzene and said p-dihalobenzene are each selected from the group consisting of chlorine, bromine and iodine.

11. The method of claim 9 in which water is removed from the composition formed in step (a).

12. A phenylene sulfide polymer produced by the method of claim 1 having a solubility in tetrahydrofuran at 25° C. of at least 5 parts by weight per 100 parts by weight tetrahydrofuran.

13. A phenylene sulfide polymer produced by the method of claim 9 having a solubility in tetrahydrofuran at 25° C. of at least 5 parts by weight per 100 parts by weight tetrahydrofuran.

14. A phenylene sulfide polymer produced by the method of claim 11 having a solubility of greater than 20 g in 100 g tetrahydrofuran at 25° C., an inherent viscosity of about 0.09 as determined at 206° C. in 1-chloronaphthalene at a polymer concentration of 0.4 g/100 ml solution, and a glass transition temperature of about 49° C.

15. A phenylene sulfide polymer produced by the method of claim 11 having a solubility of about 42 g in 100 g tetrahydrofuran at 25° C., an inherent viscosity of about 0.05 as determined at 206° C. in 1-chloronaphthalene at a polymer concentration of 0.4 g/100 ml solution, and a glass transition temperature of about 27° C.

* * * * *